(12) United States Patent
Wesolkowski

(10) Patent No.: US 6,587,576 B1
(45) Date of Patent: Jul. 1, 2003

(54) METHOD OF QUANTIFYING THE QUALITY OF A GRAY SCALE IMAGE OF A DOCUMENT AND AN APPARATUS THEREFOR

(75) Inventor: Slawomir B. Wesolkowski, Kitchener (CA)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/573,096

(22) Filed: May 17, 2000

(51) Int. Cl.$^7$ ................................................ G06K 9/00
(52) U.S. Cl. ........................ 382/112; 382/170; 382/225
(58) Field of Search ............................... 382/112, 168, 382/170, 171, 225

(56) References Cited

U.S. PATENT DOCUMENTS 5,566,245 A * 10/1996 Zheng et al. ............... 382/112

* cited by examiner

Primary Examiner—Jon Chang
Assistant Examiner—Charles Kim
(74) Attorney, Agent, or Firm—Michael Chan

(57) ABSTRACT

A method of processing a document comprises the steps of (a) scanning a document to obtain gray scale image data associated with the document, (b) generating a two-dimensional histogram based upon the gray scale image data obtained in step (a), (c) applying a clustering algorithm to the two-dimensional histogram to determine a set of cluster center parameters associated with a first cluster of pixels and a set of cluster center parameters associated with a second cluster of pixels, (d) determining the standard Euclidean distance between the sets of cluster center parameters, and (e) normalizing the distance determined in step (d) to provide a value indicative of the quality of the document. The normalized result in step (e) may be a value between zero and one, and the algorithm includes a k-means clustering algorithm. The one cluster of pixels is representative of background of the document and the other cluster of pixels is representative of foreground of the document. One cluster of pixels is located above the other cluster of pixels. The above cluster of pixels is representative of background of the document and the other cluster of pixels is representative of foreground of the document.

12 Claims, 3 Drawing Sheets

METHOD OF QUANTIFYING THE QUALITY OF A GRAY SCALE IMAGE OF A DOCUMENT AND AN APPARATUS THEREFOR

BACKGROUND OF THE INVENTION

The present invention relates to quality of document images, and is particularly directed to an apparatus and method of quantifying the quality of a gray scale document image which has been provided in an image-based document processing system such as an image-based check processing system.

In known image-based check processing systems in which a gray scale image of the check is provided from scanning a bank check, a binarization program is usually applied to gray scale image data representative of the gray scale image of the check to provide binary image data which is representative of a binary image of the check. Since computation costs associated with a binarization program and processing the binary image data itself are relatively high, it would be desirable to establish the quality of the gray scale image of the check before the associated gray scale image data is binarized to provide the binary image data which is representative of the binary image of the check.

SUMMARY OF THE INVENTION

In accordance with one aspect of the present invention, a method of processing a document comprises the steps of (a) scanning a document to obtain gray scale image data associated with the document, (b) generating a two-dimensional histogram based upon the gray scale image data obtained in step (a), (c) applying a clustering algorithm to the two-dimensional histogram to determine a set of cluster center parameters associated with a first cluster of pixels and a set of cluster center parameter associated with a second cluster of pixels, (d) determining the standard Euclidean distance between the sets of cluster center parameters, and (e) normalizing the distance determined in step (d) to provide a value indicative of the quality of the document.

Preferably, the normalized result in step (e) is a value between zero and one, and the algorithm includes a k-means clustering algorithm. The one cluster of pixels is representative of background of the document and the other cluster of pixels is representative of foreground of the document. One cluster of pixels is located above the other cluster of pixels. The above cluster of pixels is representative of background of the document and the other cluster of pixels is representative of foreground of the document.

In accordance with another aspect of the present invention, an apparatus is provided for quantifying the quality of a gray scale document image. The apparatus comprises means for scanning the document to obtain gray scale image data associated with the document, and means for generating a two-dimensional histogram based upon the gray scale image data. Means is provided for applying a clustering algorithm to the two-dimensional histogram to determine a set of cluster center parameters associated with a first cluster of pixels and a set of cluster center parameters associated with a second cluster of pixels. Means is provided for determining the standard Euclidean distance between the sets of cluster center parameters. Means is provided for normalizing the standard Euclidean to provide a value indicative of the quality of the document.

Preferably, the normalized distance is a value between zero and one, and the algorithm includes a k-means clustering algorithm. The one cluster of pixels is representative of background of the document and the other cluster of pixels is representative of foreground of the document. One cluster of pixels is located above the other cluster of pixels. The above cluster of pixels is representative of background of the document and the other cluster of pixels is representative of foreground of the document.

BRIEF DESCRIPTION OF THE DRAWING

The foregoing and other features of the present invention will become apparent to one skilled in the art to which the present invention relates upon consideration of the following description of the invention with reference to the accompanying drawings, wherein.

DETAILS OF THE INVENTION

The present invention is directed to an apparatus and method of quantifying the quality of a gray scale document image which has been provided in an image-based document processing system such as an image-based check processing system. The document may be of any type. By way of example, a document in the form of a bank check is processed in accordance with the present invention.

Figure 1:
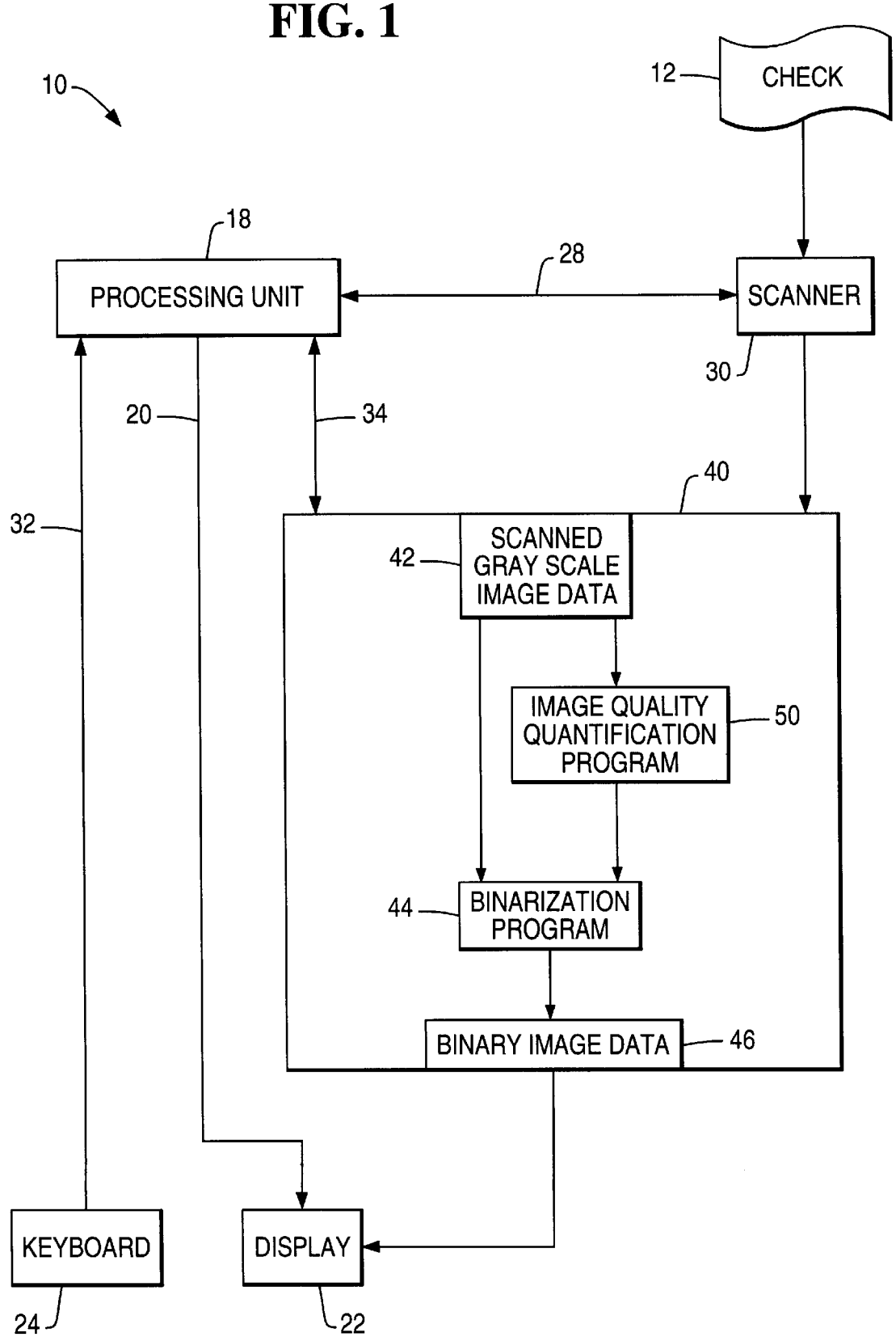
FIG. 1 is a block diagram representation of an image-based check processing system embodying the present invention.

Referring to FIG. 1, an image-based check processing system 10 includes a processing unit 18 which is electrically connected via bus line 20 to a display 22. The processing unit 18 is also electrically connected via bus line 32 to a keyboard 24 and via bus line 34 to a system memory 40. The system memory 40 includes memory space which stores, inter alia, scanned gray scale image data 42, binary image data 46, and a number of application programs.

The application programs stored in the system memory 40 include a binarization program 44. Many different binarization programs are known and, therefore, will not be described herein. The application programs stored in the system memory 40 further include an image quality quantification program 50 in accordance with the present invention which will be described in detail later.

The check processing system 10 further includes a scanner device 30 which is electrically connected via bus line 28 to the processing unit 18. Preferably, the processing unit 18 is a microcomputer, and the system memory 40 is a random access type of memory. Suitable microcomputers and memories are readily available in the marketplace. Their structure and operation are well known and, therefore, will not be described.

During operation, the scanner device 30 lifts an image of a bank check 12 when the check is moved past the scanner device. The scanner device 30 produces pixels each pixel having a particular gray level associated therewith. The gray level of the pixel is stored as gray scale image data 42 in the system memory 40 as shown in FIG. 1. The process of lifting an image of the check 12 and storing the image as gray scale image data 42 in system memory 40 is known and, therefore, will not be described. The gray scale image data 42 associated with all the pixels form a gray scale image of the check 12.

After the gray scale image data 42 is stored in the system memory 40, the image quality quantification program 50 quantifies the quality of the gray scale image which is represented by the gray scale image data 42 in accordance with the present invention which is described hereinbelow. The binarization program 44 then binarizes the gray scale image data 42 to provide corresponding binary image data 46 which is representative of the binary image of the check 12. The corresponding binary image of the check 12 is displayed on the display 22.

Figure 2:
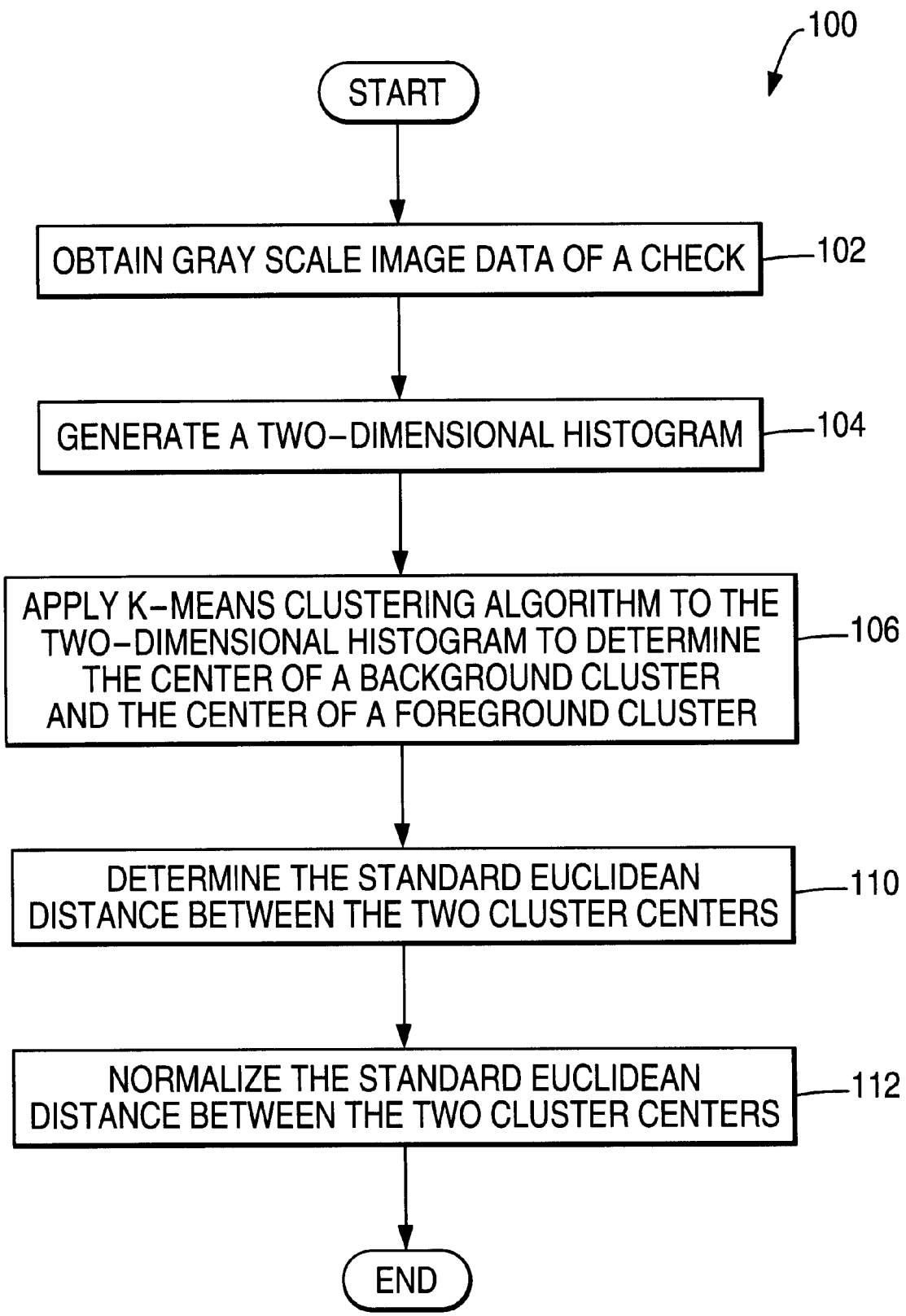
FIG. 2 is a flowchart depicting a process carried out by the system of FIG. 1 to quantify the quality of a gray scale image of the check.

Referring to FIG. 2, a flowchart 100 depicts processes carried out by the image quality quantification program 50 in accordance with the present invention. In step 102, the gray scale image data 42 which has been obtained from the check 12 is stored in the system memory 40. Then, in step 104, a two-dimensional histogram is generated based upon the gray scale image data 42. More specifically, the histogram is constructed by counting the number of pixels that have the same background and foreground values. Foreground values are represented by the value of the pixel itself (call this pixel "A" for example). Background values are obtained by averaging an N×N window centered at pixel "A". A typical value for N is 25. The value at any point on the histogram is equal to the sum of the number of pixels in the gray scale image of the check 12 with these background and foreground values.

Figure 3:
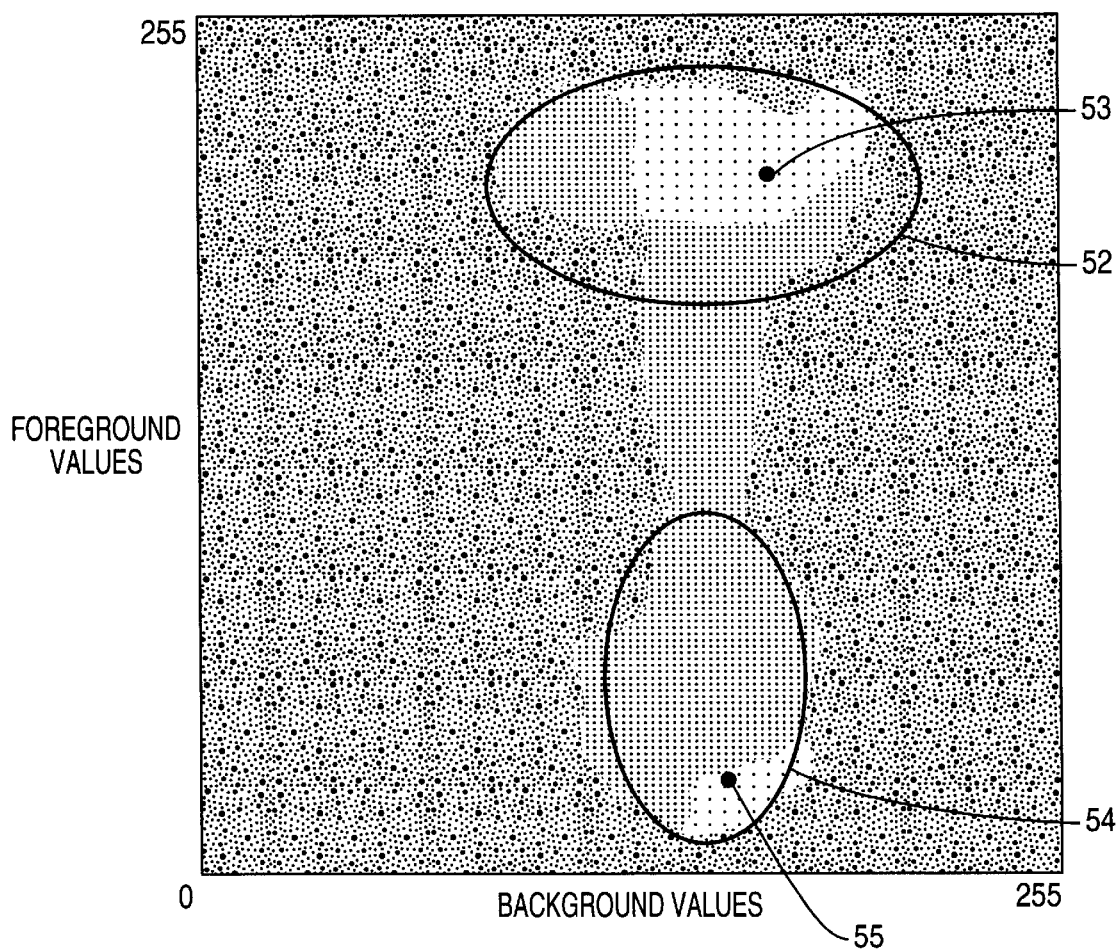
FIG. 3 is an example of a two-dimensional histogram which is generated in the process of the flowchart of FIG. 2.

An example of a two-dimensional histogram which is generated based upon the gray scale image data 42 is shown in FIG. 3. Light points on the histogram correspond to a heavy concentration of pixels and dark points on the histogram correspond to a low concentration of pixels. For gray scale images of checks, it can be hypothesized that the two-dimensional histogram will contain two clusters 52, 54 of heavy concentrations of pixels. One cluster 52 represents the background pixels and is usually located as a blob in the upper half of the histogram. The other cluster 54 represents the foreground pixels and is usually located as another blob in the lower half of the histogram.

After the two-dimensional histogram of FIG. 3 is generated in step 104, the well known k-means (sometimes known as c-means) clustering algorithm is applied to the histogram with a cluster number set at two and with a constraint that one cluster (i.e., the background cluster 52) needs to be above the other cluster (i.e., the foreground cluster 54). The k-means clustering algorithm returns the center 53 of the background cluster 52 and center 55 of the foreground cluster 54, as shown in steps 106 and 108. If desired, it is contemplated that vertical and horizontal projections may be used to determine the initial cluster center parameters.

After the centers 53, 55 of the background and foreground clusters 52, 54 are determined in steps 106 and 108, the standard Euclidean distance between the two cluster centers is determined as shown in step 110. Then, in step 112, the standard Euclidean distance between the two cluster centers 53, 55 is normalized to provide a quality metric value which is between zero and one. The quality metric value provided in step 112 is interpreted as explained hereinbelow.

If the quality metric value is close to one, then this is indicative of the background and foreground clusters 52, 54 being well separated apart from each other. In this case, the gray scale image of the check 12 has good contrast between the print and the background. This means that application of the binarization program 44 should be fairly successful because the gray scale image of the check 12 is of relatively good quality. However, if the quality metric value is close to zero, then this is indicative of the background and foreground clusters 52, 54 being fairly close to each other and may even overlap each other quite extensively. This means that application of the binarization program 44 will probably not be successful because of the gray scale image of the check 12 is of relatively poor quality. This may occur, for example, when the text and background patterns have similar contrasts and it is difficult to distinguish visually between text and background.

A number of advantages result by quantifying the image quality of the gray scale image of the check 12 .as described hereinabove. One advantage is that computational costs are minimized. Computation costs are minimized because the binarization program 44 is not applied to the gray scale image data 42 associated with the check 12 to produce the corresponding binary image of the check until a determination has been made that the quality of the associated gray sale image of the check 12 meets a minimum quality standard. Another advantage is that gray scale images of checks with merged foreground and background can be flagged and then processed separately through special binarization programs, for example.

From the above description of the invention, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of processing a document, the method comprising the steps of:
    (a) scanning a document to obtain gray scale image data associated with the document;
    (b) generating a two-dimensional histogram based upon the gray scale image data obtained in step (a);
    (c) applying a clustering algorithm to the two-dimensional histogram to determine a set of cluster center parameters associated with a first cluster of pixels and a set of cluster center parameters associated with a second cluster of pixels;
    (d) determining the standard Euclidean distance between the sets of cluster center parameters; and
    (e) normalizing the distance determined in step (d) to provide a value indicative of the quality of the document.

2. A method according to claim 1, wherein the normalized result in step (e) is a value between zero and one.

3. A method according to claim 1, wherein the algorithm includes a k-means clustering algorithm.

4. A method according to claim 1, wherein the one cluster of pixels is representative of background of the document and the other cluster of pixels is representative of foreground of the document.

5. A method according to claim 1, wherein one cluster of pixels is located above the other cluster of pixels.

6. A method according to claim 5, wherein the above cluster of pixels is representative of background of the document and the other cluster of pixels is representative of foreground of the document.

7. An apparatus for quantifying the quality of a gray scale document image, the apparatus comprising:
    means for scanning the document to obtain gray scale image data associated with the document;
    means for generating a two-dimensional histogram based upon the gray scale image data;

means for applying a clustering algorithm to the two-dimensional histogram to determine a set of cluster center parameters associated with a first cluster of pixels and a set of cluster center parameters associated with a second cluster of pixels;

means for determining the standard Euclidean distance between the sets of cluster center parameters; and means for normalizing the standard Euclidean to provide a value indicative of the quality of the document.

8. An apparatus according to claim 7, wherein the normalized distance is a value between zero and one.

9. An apparatus according to claim 7, wherein the algorithm includes a k-means clustering algorithm.

10. An apparatus according to claim 7, wherein the one cluster of pixels is representative of background of the document and the other cluster of pixels is representative of foreground of the document.

11. An apparatus according to claim 7, wherein one cluster of pixels is located above the other cluster of pixels.

12. An apparatus according to claim 11, wherein the above cluster of pixels is representative of background of the document and the other cluster of pixels is representative of foreground of the document.

\* \* \* \* \*